United States Patent
Spence et al.

(10) Patent No.: US 11,441,420 B2
(45) Date of Patent: Sep. 13, 2022

(54) SYSTEM AND METHOD FOR USING GEOLOGICAL ANALYSIS FOR THE DESIGNING OF STIMULATION OPERATIONS

(71) Applicant: CGG SERVICES SAS, Massy (FR)

(72) Inventors: Graham Spence, Katy, TX (US); Chi Vinh Ly, Houston, TX (US); Guy Oliver, Katy, TX (US)

(73) Assignee: CGG SERVICES SAS, Massy (FR)

( * ) Notice: Subject to any disclaimer, the term of this patent is extended or adjusted under 35 U.S.C. 154(b) by 920 days.

(21) Appl. No.: 16/312,495

(22) PCT Filed: Sep. 6, 2017

(86) PCT No.: PCT/IB2017/001276
§ 371 (c)(1),
(2) Date: Dec. 21, 2018

(87) PCT Pub. No.: WO2018/047009
PCT Pub. Date: Mar. 15, 2018

(65) Prior Publication Data
US 2019/0145253 A1    May 16, 2019

Related U.S. Application Data

(60) Provisional application No. 62/384,325, filed on Sep. 7, 2016.

(51) Int. Cl.
*E21B 49/06* (2006.01)
*E21B 49/00* (2006.01)
(Continued)

(52) U.S. Cl.
CPC .............. *E21B 49/06* (2013.01); *E21B 43/26* (2013.01); *E21B 49/005* (2013.01); *G01V 99/00* (2013.01); *E21B 21/065* (2013.01)

(58) Field of Classification Search
CPC ........ E23B 49/06; E23B 43/26; E23B 49/005; G01V 99/00; G01V 1/50; G01V 3/12;
(Continued)

(56) References Cited

U.S. PATENT DOCUMENTS

| | | | |
|---|---|---|---|
| 2007/0061080 A1* | 3/2007 | Zhdanov | G01V 3/12 702/7 |
| 2014/0046628 A1* | 2/2014 | Ligneul | G01B 11/0608 702/158 |

(Continued)

OTHER PUBLICATIONS

Guy Oliver "Advanced cutting analysis provides improved completion design, efficiency and well production" (Year: 2016).*

(Continued)

*Primary Examiner* — Catherine T. Rastovski
*Assistant Examiner* — Kaleria Knox
(74) *Attorney, Agent, or Firm* — Patent Portfolio Builders PLLC

(57) ABSTRACT

Well completion is accomplished by obtaining a sample of geological material from the subsurface and generating primary data for the sample of geological material. The primary data include textural data, chemical data and mineralogical data. The primary data are used to derive secondary data for the sample of geological material, and the primary data and the secondary data are used to generate tertiary data for the sample of geological material. The tertiary data are a quantification of physical characteristics of the sample of geological material. The primary data, secondary data and tertiary data are used to determine a location of a stage along a well and an arrangement of perforation clusters in the stage.

18 Claims, 4 Drawing Sheets

(51) Int. Cl.
  *G01V 99/00*   (2009.01)
  *E21B 43/26*   (2006.01)
  *E21B 21/06*   (2006.01)
(58) Field of Classification Search
  CPC ..... E21B 21/065; E21B 34/14; H05K 999/99; G06F 16/245; G01B 11/0608
  See application file for complete search history.

(56) References Cited

U.S. PATENT DOCUMENTS

| | | | | |
|---|---|---|---|---|
| 2014/0151043 A1* | 6/2014 | Miller | ............. | E21B 34/14 166/285 |
| 2015/0000903 A1* | 1/2015 | Ly | ............. | H05K 999/99 166/250.02 |
| 2015/0353812 A1* | 12/2015 | Vo | ............. | E21B 43/26 166/300 |
| 2016/0349389 A1* | 12/2016 | Walters | ............. | G01V 1/50 |
| 2017/0002630 A1* | 1/2017 | Priezzhev | ............. | G06F 16/245 |

OTHER PUBLICATIONS

Anonymous, "From Cuttings To Completions: Automated Wellsite Mineralogy Comes of Age", Oct. 1, 2015, pp. 1-2, retrieved from Internet: URL:https://www.epmag.com/cuttings-completions-automated-wellsite-mineralogy-comes-age-820611#p=full.

Brian "BJ" Davis et al., "SPE-174282-MS Wellsite Mineralogical Data Acquisition; Understanding Results from Multiple Analytical Sources", SPE European Formation Damage Conference and Exhibition, Jun. 5, 2015, pp. 1-26.

Daniel M. Jarvie et al., "Unconventional shale-gas systems: The Mississippian Barnett Shale of north-central Texas as one model for thermogenic shale-gas assessment", AAPG Bulletin, Apr. 2007, pp. 475-499, vol. 91, No. 4.

Fred P. Wang et al., "Screening Criteria for Shale-Gas Systems", The Gulf Coast Association of Geological Societies, 2009, pp. 779-793, vol. 59.

Guy Oliver et al., "Advanced cuttings analysis provides improved completion design, efficiency and well production", First Break, Feb. 2016, pp. 71-78, vol. 34.

International Search Report and Written Opinion, dated Jan. 22, 2018, from corresponding/related International Application No. PCT/IB2017/001276.

Neil Peake et al., "Shale Science Alliance", May 1, 2014, pp. 1-5, retrieved from Internet: URL:http://www.globaldatasales.com/technicalDocuments/cggv_0000020862.pdf.

Tom Ashton et al., "SPE 165353 Portable Technology Puts Real-time Automated Mineralogy on The Well Site", SPE Western Regional & AAPG Pacific Section Meeting, Joint Technical Conference, Apr. 25, 2013, pp. 1-11.

* cited by examiner

SYSTEM AND METHOD FOR USING GEOLOGICAL ANALYSIS FOR THE DESIGNING OF STIMULATION OPERATIONS

CROSS REFERENCE TO RELATED APPLICATIONS

This application is a National Stage of PCT Application No. PCT/IB2017/001276, filed Sep. 6, 2017, which claims priority and benefit from U.S. Provisional Patent Application No. 62/384,325, filed Sep. 7, 2016, for "System and Method for Using Geological Analysis for the Designing of Stimulation Operations", the entire contents of which is incorporated herein by reference.

TECHNICAL FIELD

Exemplary embodiments are directed to systems and methods for arranging and locating perforated well casings for fracking operations.

BACKGROUND

Deviated drilling and hydraulic fracturing (fracking) is a game changing technology that has allowed the energy industry to access hydrocarbon deposits previously thought to be uneconomical. Operators drilling long deviated wells for fracking can either run expensive wireline tools along the deviation portion of the well or can frack the wells with limited subsurface information. Due to the cost associated with wireline tools and the risk of either damaging these tools due to well deviation or loosing these tools when the tools stick in the well, many operators frack wells with limited information of the subsurface. Most operators therefore frack these deviated wells using a uniform geometric pattern that often does not accurately represent the geological heterogeneities likely to occur within the subsurface.

The horizontal heterogeneous nature of geology means that a deviated well is likely to encounter geological formations with different physical rock properties. These changes in rock properties mean that not all the rocks will behave the same under the engineering conditions being imposed during a geometric frack operation. Thus, there is a potential that not all the stages of a frack operation will fully contribute to the final production volume.

SUMMARY

Embodiments are directed to systems and methods for the determination of the subsurface geology using geological samples obtained during the drilling process of well bores, vertical or deviated. The data are used to determine a frack completion strategy to optimize the placement of stages and perforation windows to account for the changes in rock properties and geological heterogeneity. As geological material generated from the drilling process is used, the desired geological and lithological data form the subsurface can be obtained. The use of additional wireline tools for insertion in the well are less of a requirement, and the reduction in the use of such wireline tools in the well reduces both the cost and the risk to operators.

Exemplary embodiments are directed to a method for well completion that obtains at least one sample of geological material from a subsurface and generates primary data for the at least one sample of geological material. The primary data include at least one of textural data, chemical data and mineralogical data. The primary data are used to derive secondary data for the at least one sample of geological material from the textural data, the chemical data and the mineralogical data, and the primary data and the secondary data are used to generate tertiary data for the at least one sample of geological material. The tertiary data are a quantification of physical characteristics of the at least one sample of geological material. The primary data, secondary data and tertiary data are used to determine a location of a stage along a well and an arrangement of perforation clusters in the stage.

Exemplary embodiments are also directed to a method for well completion that obtains a plurality of samples of geological material for a subsurface. Each sample of geological material is obtained from a unique position along a well passing through the subsurface. Primary data for each sample of geological material are generated. The primary data include at least one of textural data, chemical data and mineralogical data. The primary data are used to derive secondary data for each sample of geological material from the textural data, the chemical data and the mineralogical data, and the primary data and the secondary data are used to generate tertiary data for the sample of geological material. The tertiary data are a quantification of physical characteristics of each sample of geological material. The quantification of physical characteristics of each sample of geological material is used to place the plurality of samples of geological material into a plurality of groups. Each group has similar physical characteristics. The primary data, secondary data, tertiary data and groups are used to determine a location of a plurality of stages along a well and an arrangement of perforation clusters in each stage.

Exemplary embodiments are directed to a system for well completion. The system includes a geological sampling mechanism to obtain a plurality of samples of geological material for a subsurface. Each sample of geological material is obtained from a unique position along a well passing through the subsurface. A primary data generating unit is included to generate primary data for each sample of geological material. The primary data include at least one of textural data, chemical data and mineralogical data. A secondary data generating unit used the primary data to derive secondary data for each sample of geological material from the textural data, the chemical data and the mineralogical data, and a tertiary data generating unit uses the primary data and the secondary data to generate tertiary data for the sample of geological material. The tertiary data are a quantification of physical characteristics of each sample of geological material and to place the plurality of samples of geological material into a plurality of groups. Each group contains similar physical characteristics. A well completion determination unit is included to use the primary data, secondary data and tertiary data to determine a location of a plurality of stages along a well and an arrangement of perforation clusters in each stage.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
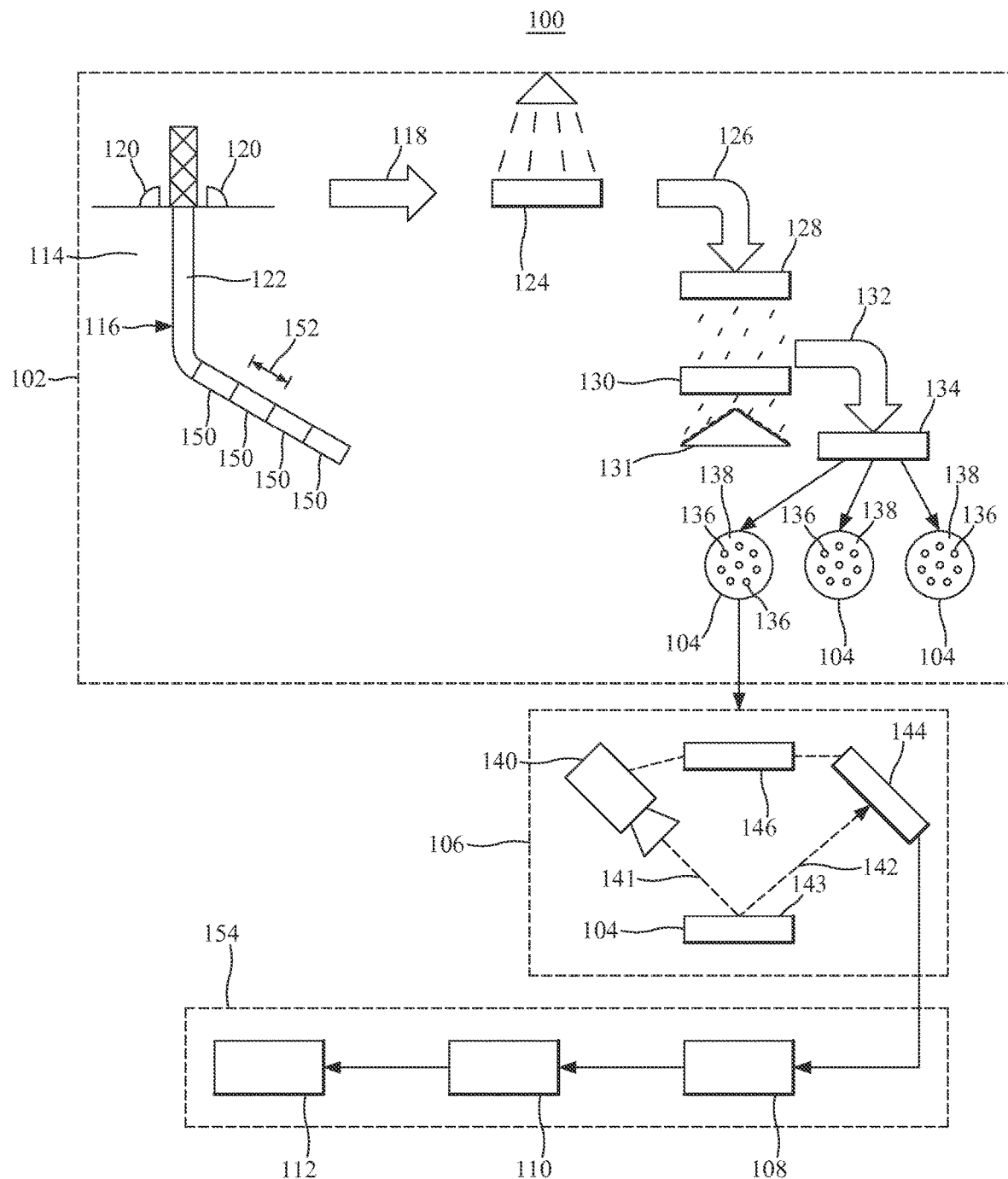
FIG. 1 is a schematic representation of an embodiment of a system for well completion.

Referring initially to FIG. 1, exemplary embodiments are directed to a system 100 for well completion. The system includes a geological sampling mechanism 102 to obtain a plurality of samples of geological material 104 for a subsurface 114 containing a well 116. Suitable wells include, but are not limited to, vertical wells and deviated wells. Each sample of geological material is obtained from a unique position along the well as the drill bit passes through the subsurface. In one embodiment, geological material 118 obtained from the subsurface and generated during drilling is used for the optimization of a completion strategy. Suitable geological material 118 includes cuttings 120 generated from the drilling process, which are ejected from the borehole using either a water or oil based fluid. Suitable geological material also includes rock chips or rock cores 122 generated during traditional well bore or side-wall core, coring operations. The collected geological material is used to generate the samples of geological material.

The system includes a washing station 124 to produce cleaned geological material 126 using petrochemical fluids and water, as well as other organic and inorganic solvents and detergents. Suitable washing stations and methods for cleaning the geological material are known and available in the art. In one embodiment, for example when the cleaned geological material includes drill cuttings, the cleaned geological material is passed through a coarse sieve 128 to remove all material that is in the range of equal or greater than 2 mm in size, which can be referred to as cave-in material. All the remaining material less than 2 mm in size is further passed through a fine sieve 130 to allow fine rock flour 131 to pass, with the accepted size being in the range of about 0.06 mm (60 microns). The remaining cleaned and sieved geological material 132, which is smaller than cave-in and larger than rock flour, contains particles in the range of from about 0.06 mm to about 2 mm.

The remaining cleaned and sieved geological material 132 is passed through a sample preparation system 134 to prepare the remaining cleaned and sieved geological material for analysis as per the requirements for the instrument being used and to generate the samples of geological material 104. The sample preparation system immobilizes the particles 136 in a polymerized plastic or resin block 138 and exposes a cross-sectional surface of one plane of the block. This exposes a cross section of multiple geological particles 136.

The system includes a primary data generating unit 106. Each sample of geological material 104 is placed in the primary data generating unit, and primary data for each sample of geological material is generated. The primary data include at least one of in-situ textural data, chemical data and mineralogical data. In general, the primary data generating unit maps the mineralogy of each sample of geological material. This provides an identification of the types of minerals in each sample of geological material and the in-situ location of those types of minerals within each sample of geological material.

In one embodiment, the primary data generating unit is an automated mineralogical (AM) analysis unit. Automated mineralogical analysis involves scanning of a lepton beam over the surface of each sample of geological material and measuring the various outcomes from the surface interactions with the lepton beam. Therefore, the primary generating unit includes at least one lepton beam generating unit 140 to direct a lepton beam 141 onto the surface 143 of the sample of geological material and at least one reader 144 to receive the resultant radiation 142 reflected or generated by the surface 143 of the sample of geological material 104. The resultant radiation from this interaction with the lepton beam includes, but is not limited to, electromagnetic radiation, secondary generated leptons or baryons or the original lepton from the incident lepton beam reflected from the surface 143.

The resultant leptons, either the secondary generated leptons or the reflected original leptons, are used to image the sample of geological material. In one embodiment, the primary data generating unit includes a scanning electron microscope (not shown) to generate the image of the sample of geological material. The primary data generating unit includes a controller 146 in communication with the lepton beam generating unit and the reader to control the generation of lepton beams and to obtain and process data generated by the reader. In one embodiment, the controller uses the image of the sample generated from these leptons to determine a volume of non-mineral material in the sample of geological material. In one embodiment, the controller determines the volume of non-mineral and non-binder material in each sample of geological material. The controller can use data collected on the electromagnetic radiation generated from the lepton beam interaction with the surface of the sample of geological material to determine the spatial distribution of elements throughout the sample of geological material. The controller then uses the spatial elemental data to infer the mineralogical assemblage of the sample, and to generate either a spatially mapped mineralogical image of the sample of geological material or a single bulk mineral composition of the sample of geological material.

The system includes a secondary data generating unit 108 in communication with the primary data generating unit and in particular at least one of the reader or the controller. The secondary data generating unit uses the primary data to derive secondary data for each sample of geological material. The secondary data are derived from one or more of the textural data, the chemical data and the mineralogical data. Suitable secondary data include, but are not limited to, at least one of a brittleness index (BI), a distribution of the size of the void spaces detected in the primary data, a distribution of a measure of the shape of the void spaces and a combination of both distributions. Suitable measures of the shape of the void spaces include, but are not limited to, aspect ratio and circularity.

In one embodiment, the derived secondary data points include a brittleness index (BI). In one embodiment, the BI is based on the calculation of the volume of silicate, carbonate and clay minerals measured in the samples. Different formula can be used to calculate BI from the primary data. Exemplary BI calculations are found in Jarvie et al., "Unconventional Shale-Gas Systems: The Mississippian Barnett Shale of North-Central Texas as One Model for Thermogenic Shale-Gas Assessment", AAPG Bulletin, v. 91, no. 4, pp. 475-499 (2007) and Wang and Gale, "Screening Criteria for Shale-Gas Systems", Gulf Coast Association of Geological Societies Transactions, v. 59, pp. 779-793 (2009), the entire disclosures of which are incorporated herein by reference. Each proposes BI definitions based on the mineral composition of the rock, dividing the most brittle minerals by the sum of the constituent minerals in the rock sample, considering quartz (and dolomite, in the case of Wang and Gale) as the more brittle minerals:

$$BI_{jarvie} = \frac{Qz}{Qz + Ca + Cly}; \text{ and } BI_{wang} = \frac{Qz + Dol}{Qz + Dol + Ca + Cly + TOC}.$$

where Qz is the fractional quartz content, Dol the dolomite content, Ca the calcite content, TOC the total organic carbon content, and Cly the clay content by weight in the rock.

The secondary data derived from the primary data can also include at least one of a distribution of the size of the void spaces detected and a distribution of a measure of the shape of those void spaces. In one embodiment, void space data generated from the imaging data, i.e., the primary data, is further analyzed to generate a distribution of the size of the void spaces detected and a distribution of a measure of the shape of the void spaces. This measure of the shape can be derived and described using such calculations as aspect ratio and circularity.

$$\text{Aspect Ratio} \quad A_R = \frac{d_{min}}{d_{max}}$$

$$\text{Circularity} \quad f_{circ} = \frac{4\pi A}{P^2}$$

The system includes a tertiary data generating unit 110 in communication with the primary data generating unit and the secondary data generating unit. The tertiary data generating unit uses the primary data and the secondary data to generate tertiary data for each sample of geological material. The tertiary data include a quantification of physical characteristics of each sample of geological material. The tertiary data generating unit uses the quantification of physical characteristics to place the plurality of samples of geological material into a plurality of groups. Each group represents similar physical characteristics for the samples of geological material contained in that group.

In one embodiment, the tertiary data are referred to as RockType data, which are derived from both primary and secondary data sets. RockType data quantify the samples of geological material into unique groups with similar physical characteristics. In one embodiment, the RockType data include the addition of the average shape factor, porosity and BI, and each sample of geological material is placed into unique categories depending on the result from this RockType calculation.

In one embodiment, the RockType data include a combination of the size distribution of detected pores, a measure of the brittleness of the formation and the shape of the void spaces detected. The RockType data may be quantified through an arithmetic combination of these three components, with the value defined for the pore size distribution reflecting a selected group of pores from a given size range or a ratio of pores between two different size ranges. Examples of these arithmetic combinations include:

RockType=(Volume of Pores of Certain Size)×(Brittleness Index)×(Aspect Ratio)

RockType=(Volume of Pores of Certain Size)+(Brittleness Index)+(Aspect Ratio)

All other possible arithmetic combinations and permutations of these three values can be used. As used herein, certain size could be, for example, the largest pore value, the smallest pore value or anything specific depending on the subsurface.

All the primary data, secondary data and tertiary data are compiled and relevant data is then used to design a completion strategy for the well. Therefore, the system includes a well completion determination unit 112 in communication with the primary data unit, the secondary data unit and the tertiary data unit. The well completion determination unit uses the primary data, the secondary data and the tertiary data to determine a location of a plurality of stages 150 along the well and an arrangement of perforation clusters in each stage. Each stage has a given length 152 from a predefined minimum length of from about 30 feet to a predefined maximum length of greater than about 300 feet. In one the given length is from a predefined minimum length of from about 100 feet to a predefined maximum length of about 200 feet.

In general, the well completion determination unit uses at least one of the BI and the BI in combination with quantitative RockType generated for each sample of geological material to group sections along the deviated well containing similar BI values and similar quantitative RockType. Once these groups have been defined, the length of each group is cross-correlated with the predefined minimum and maximum stage length requirements, which are based on engineering limitations. Using both the generated BI for each sample and the engineering limitations expressed through the minimum and maximum stage lengths, the well completion determination unit segments the well bore into the plurality of stages.

Following a determination and identification of the stages along the well bore, the well completion determination unit determines an arrangement of perforation clusters within each stage. The number of perforations in each cluster is determined based on a maximum limitation on making perforations, i.e., holes, and operational requirements of fracking. The number of perforation clusters can be the same for each stage or can vary from stage to stage. In addition, the number of perforations in each cluster can be the same or can vary from perforation cluster to perforation cluster. In addition to determining the number of perforation clusters per stage and the number of perforations in each perforation cluster, the well completion determination unit determines a location of each perforation cluster in each stage. In one embodiment, the well completion determination unit determines perforation cluster location based on finding rocks within each stage that contain as similar RockType or Elastic data as possible, preferably the same RockType or Elastic data associated with adjacent rock types. Additionally, the well completion determination unit also considers pore size and shape to ensure that perforation clusters are either targeting potential natural planes of weakness, caused by micro-laminations or natural fractures or, are avoiding potential large scale faults.

In one embodiment, once all the stage lengths and perforation clusters have been designed, the chemical reactivity of the formation is then determined based on testing of the geological material. This testing includes measuring the amount of swelling minerals present in the formation and measuring the reactivity of the formation to different break-down fluids. A final stage of this process is to conduct chemical testing to determine the correct break-down fluid mixture in order to maximize formation break-down and to prevent a potential reduction in permeability due to hydrophilic mineral interaction with water associated with the break-down fluid.

The secondary data determination unit, the tertiary determination unit and the well completion determination unit can be separate units or can be incorporated into a single unit or computing system 154. In one embodiment, this computing system can also include at least the controller 146 of the primary data determination unit. The computing system can be a dedicated or special purpose computing system or a general or generic computing system. In one embodiment, the various units are instances of software or modules executing on the computing system. The computing system includes all the processing, storage and communication components required to executed the functionality of the various units. Although the features and elements of the system are described in the embodiments in particular combinations, each feature or element can be used alone without the other features and elements of the embodiments or in various combinations with or without other features and elements disclosed herein.

Figure 2:
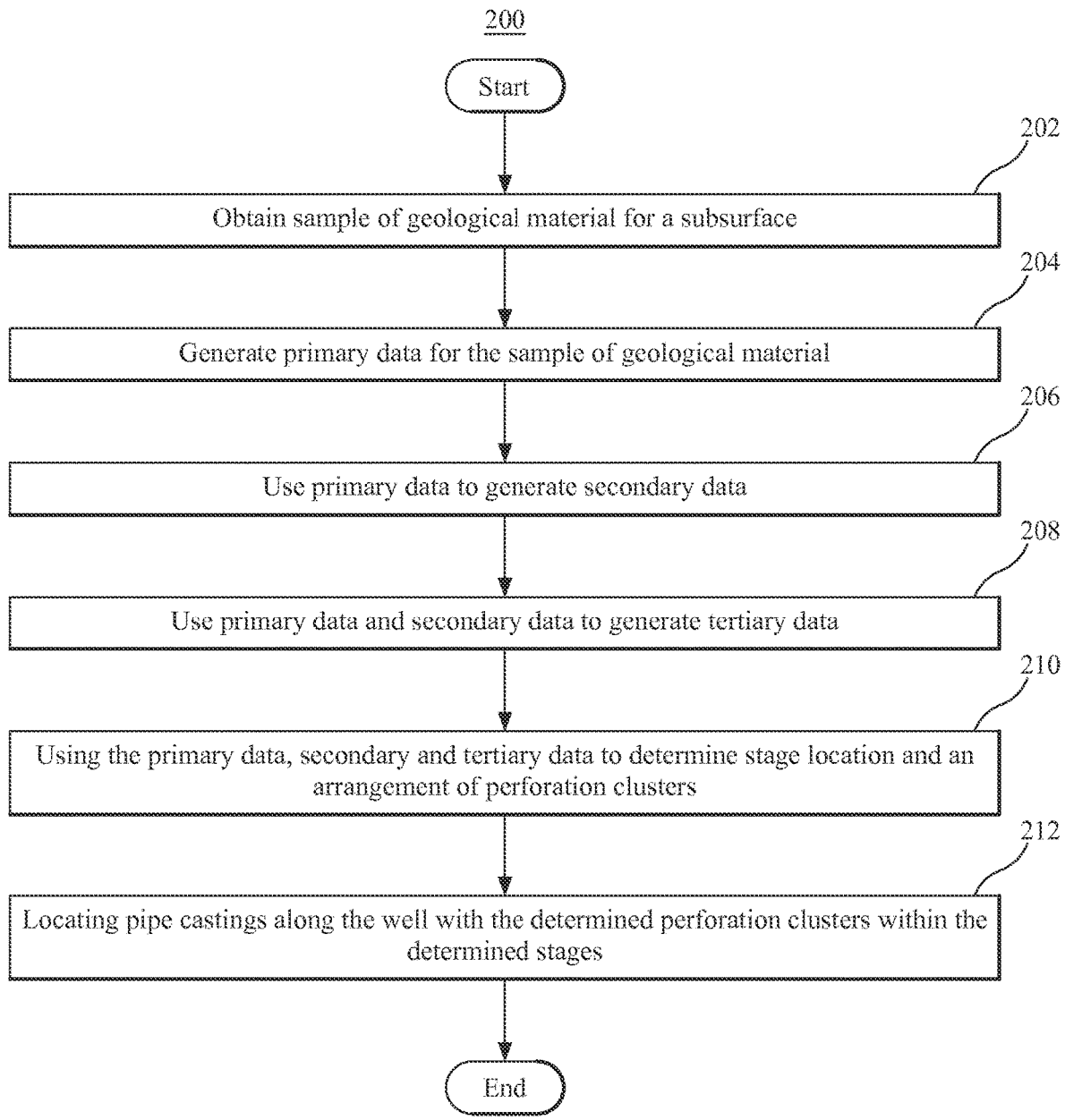
FIG. 2 is a flow chart illustrating an embodiment of a method for well completion.

Referring now to FIG. 2, exemplary embodiments are directed to a method for well completion 200. A sample of geological material for a subsurface is obtained 202. In one embodiment, obtaining the sample of geological material includes obtaining the sample of geological material from a well passing through the subsurface. Suitable wells include, but are not limited to, vertical wells and deviated wells. In one embodiment, a plurality of samples of geological material are obtained from a plurality of separate locations along a well passing through the subsurface. The sample of geological material includes cuttings generated during well drilling, rock chips, rock cores obtained during well drilling or combinations thereof. In one embodiment, the sample of geological material contains particles having a size of from about 0.06 mm to about 2 mm.

Figure 3:
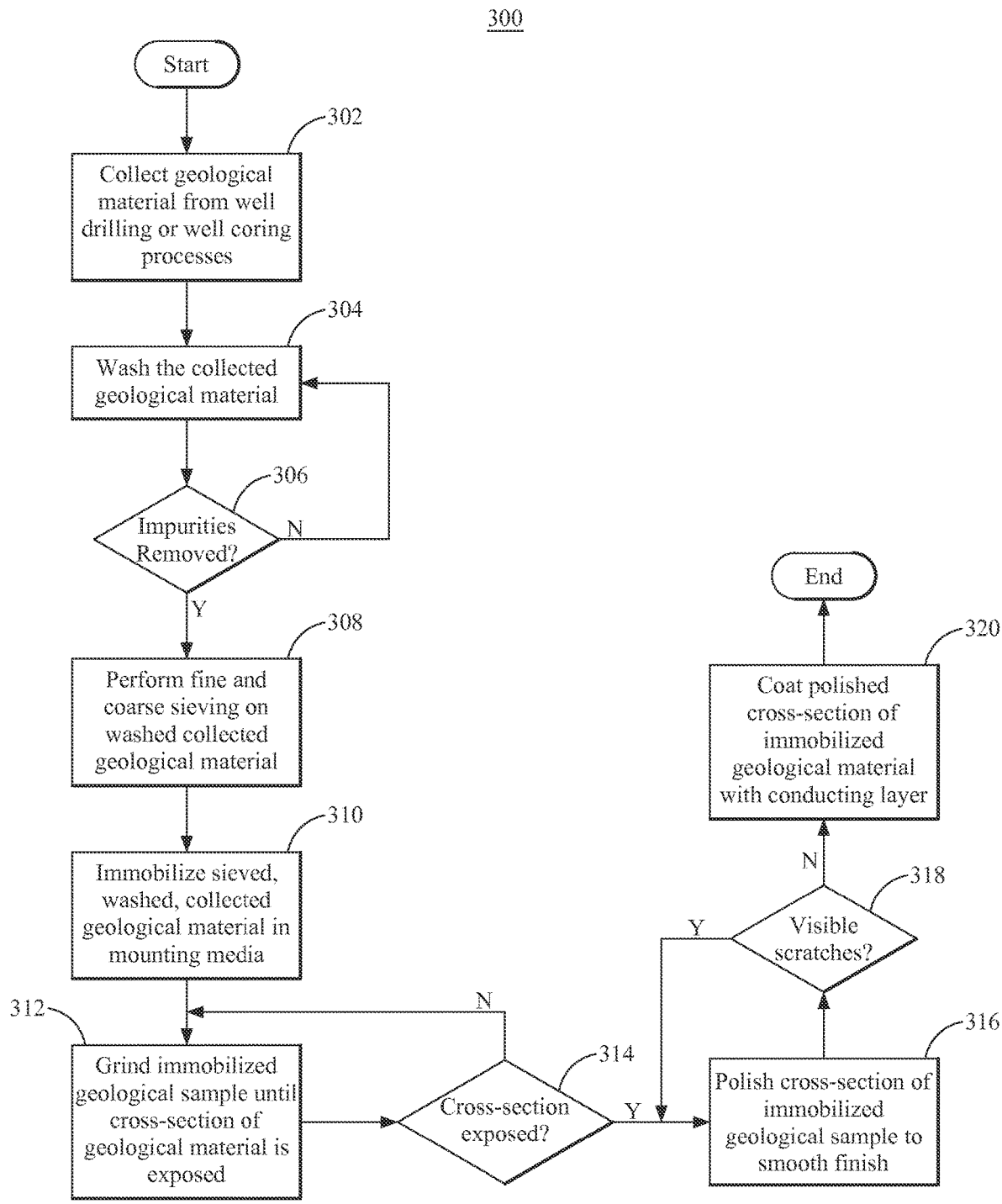
FIG. 3 is a flow chart illustrating an embodiment of a method for obtaining samples of geological material.

Referring to FIG. 3, an embodiment of a method for obtaining the sample of geological material 300 is illustrated. Geological material is collected from, for example, well drilling operations or well coring processes 302. The collected geological material is washed 304 to remove impurities such as drilling oil. The washed collected geological material is inspected to determine if the impurities have been removed 306. If not, then washing is repeated until the impurities have been sufficiently removed. Once a sufficiently washed sample is achieved, a fine and coarse sieving is performed on the washed collected geological material 308. This yields particles of from about 0.06 mm to 2 mm in the sieved washed collected geological material. The sieved washed collected geological material is immobilized in a mounting media 310. Suitable mounting media include polymers. Preferably, the immobilized sieved washed collected geological material is formed into a disc shape.

The immobilized sieved, washed and collected geological material disc is ground 312 on at least one face of the disc to expose cross-sections of the geological material in the immobilized sieved, washed and collected geological material disc. The immobilized sieved, washed and collected geological material disc is inspected to determine if the desired cross-sections of the geological material have been exposed 314. If not, grinding is continued. Once the desired cross-sections of the geological material have been exposed through grinding, the ground surface of the disc is polished 316 to a smooth finish. The polished, immobilized, sieved, washed and collected geological material disc is inspected for visible scratches 318. If scratches are visible, then polishing is continued. Once all the visible scratches have been removed, the polished cross-section of the immobilized sieved, washed and collected geological material disc is coated with a conducting layer 20. Suitable conducting layers are known and available in the art. The coated, polished, cross-sectioned, immobilized, sieved, washed and collected geological material disc is the sample of geological material that can then be processed and analyzed to produce the desired data.

Returning to FIG. 2, primary data are generated from the sample of geological material 204. The primary data include at least one of textural data, chemical data and mineralogical data and are obtained through analysis of the geological material. In one embodiment, automated mineralogical analysis is used to generate the primary data. Automated mineralogical analysis involves scanning the sample of geological material with a leptonic beam. The resulting reflected and generated radiation from the geological sample are captured. The captured radiation is analysed to measure at least one of a reflected lepton beam, electromagnetic radiation, secondary generated leptons and generated baryons. The reflected lepton beam and secondary generated leptons are used to generate images of sample of geological material. The electromagnetic radiation is used to determine spatial deposition of elements in samples of geological material.

The automated mineralogical analysis also uses the image of the sample of geological material to determine non-mineral volumes in samples of geological material. These non-mineral volumes also include non-binder volumes in the sample of geological material. Spatial deposition is used to infer the types of minerals and the location of minerals in the sample of geological material. The types of minerals and the location of minerals are used to generate at least one of a spatially mapped mineralogical image of the sample of geological material and a single bulk mineral composition of the sample of geological material.

Having generated the desired primary data, the primary data are used to derive secondary data for the sample of geological material 206. The secondary data are derived data, i.e., derived from the textural data, the chemical data and the mineralogical data obtained from an analysis of the actual sample of geological material. In one embodiment, the primary data are used to generate at least one of a brittleness index (BI) for the sample of geological material and a distribution and shape of void spaces in the sample of geological material.

The primary data and the secondary data are used to generate tertiary data for the sample of geological material 208. The tertiary data describe the characteristics of the content, i.e., the rocks, in the sample of geological material. In one embodiment, the tertiary data are a quantification of physical characteristics of the sample of geological material. In one embodiment, arithmetic combinations of at least one of the primary data and the second data are used to determine the quantification of physical characteristics of the sample of geological material.

The primary data, secondary data and tertiary data are used to determine a location of a stage along a well and an arrangement of perforation clusters in the stage 210. The located of stages and the arrangement of perforation clusters along a well constitutes the completion strategy for the well. The clusters of perforations are located along the well and aligned to allow the passage of pressurised fluid directed to locations and materials within the subsurface that will yield optimized results for fracking within the subsurface. In one embodiment, the primary data, secondary data and tertiary data are used to determine a number of perforation clusters in the stage, a number of perforations in each perforation cluster and a location of each perforation cluster in the stage. Pipe casings are created in accordance with the determined perforation clusters, and the pipe casings are located along the well in accordance with the determined perforation clusters and the determined stages 212.

Figure 4:
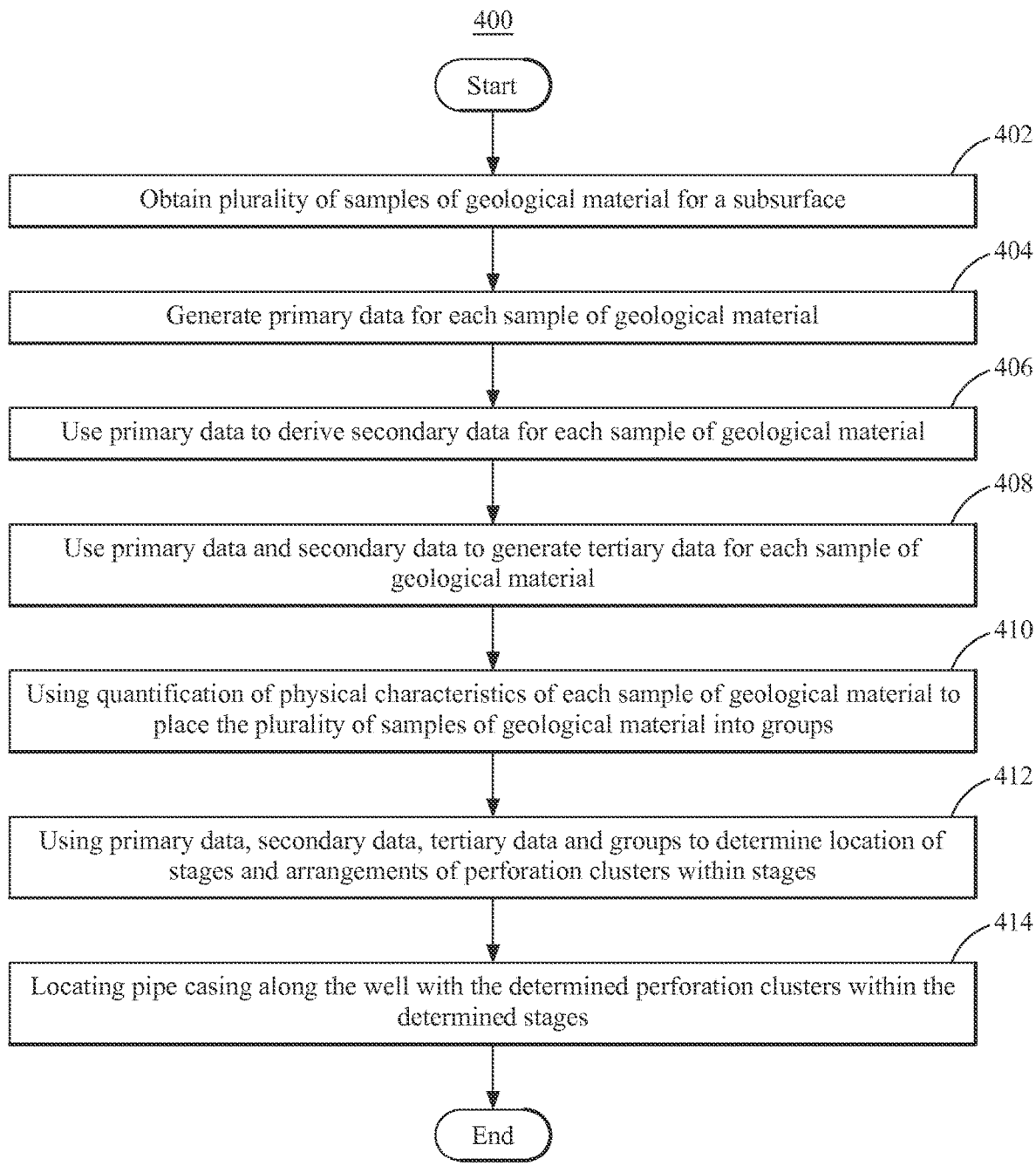
FIG. 4 is a flow chart illustrating another embodiment of a method for well completion.

Referring now to FIG. 4, exemplary embodiments are also directed to a method for well completion 400 in which a plurality of samples of geological material are obtained from the subsurface 402. Each sample of geological material is obtained from a unique position along a well passing through the subsurface, i.e., vertical well or deviated well. Primary data are generated for each sample of geological material 404. As discussed above, the primary data include at least one of textural data, chemical data and mineralogical data. In one embodiment, automated mineralogical analysis is used to generate the primary data by scanning the sample of geological material with a leptonic beam and measuring at least one of a reflected lepton beam, electromagnetic radiation, secondary generated leptons and generated baryons.

The primary data are used to derive secondary data for each sample of geological material 406 from the textural data, the chemical data and the mineralogical data in the primary data. In one embodiment, using the primary data to derive secondary data includes using the primary data to generate a brittleness index (BI) for each sample of geological material. In one embodiment, the primary data are used to generate at least one of a BI for the sample of geological material and a distribution and shape of void spaces in the sample of geological material. The primary data and the secondary data are used to generate tertiary data for the sample of geological material 408. The tertiary data are a quantification of physical characteristics of each sample of geological material. In one embodiment, arithmetic combinations of at least one of primary data and second data are used to determine the quantification of physical characteristics of the sample of geological material.

The quantification of physical characteristics of each sample of geological material is used to place the plurality of samples of geological material into a plurality of groups 410. Each group represents similar physical characteristics for samples of geological material within that group. The primary data, secondary data, tertiary data and plurality of groups are used to determine a location of a plurality of stages along a well and an arrangement of perforation clusters in each stage 412. In one embodiment, using the primary data, secondary data, tertiary data and groups to determine a location of a plurality of stages includes segmenting the well into a plurality of lengths such that the brittleness indices (BI) for all samples of geological material within a given length comprise a lowest standard deviation from a mean value of brittleness index along the given length and the given length falls within a pre-defined maximum length and minimum length. Each stage represents one of the plurality of lengths. In one embodiment, each length is from about 30 feet to greater than about 300 feet. In one each length is from about 100 feet to about 200 feet.

In one embodiment, using the primary data, secondary data, tertiary data and groups to determine the arrangement of perforation clusters in each stage includes determining a number of perforation clusters in each stage, determining a number of perforations in each perforation cluster and determining a location of each perforation cluster in each stage. Determining the location of each perforation cluster in each stage involves identifying regions along each stage where samples of geological material from a given region have similar quantifications of physical characteristics and locating a perforation cluster at each region.

The location of stages and the arrangement of perforation clusters along a well constitutes the completion plan for the well. The clusters of perforations are located along the well and aligned to allow the passage of pressurised fluid directed to locations and materials within the subsurface that will yield optimized results for fracking within the subsurface. In one embodiment, the primary data, secondary data and tertiary data are used to determine a number of perforation clusters in the stage, a number of perforations in each perforation cluster and a location of each perforation cluster in the stage. A plurality of pipe casings is created in accordance with the determined perforation clusters, and the pipe casings are located along the well in accordance with the determined perforation clusters and the determined stages 414. The pipe casings are located in the appropriate stages along the well.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for well completion, the method comprising:
   obtaining samples of geological material from a subsurface;
   generating primary data for the samples, the primary data comprising textural data and/or chemical data and/or mineralogical data;
   using the primary data to derive secondary data for each of the samples of geological material, the secondary data including a brittleness index;
   using the primary data and the secondary data to generate tertiary data for each of the samples of geological material, the tertiary data comprising a quantification of physical characteristics of the sample of geological material; and
   using the primary data, the secondary data and the tertiary data to determine a location of a stage along a well and an arrangement of perforation clusters in the stage, by segmenting the well into a plurality of lengths such that the brittleness indices for all samples of geological material within each given length among the lengths to have a lowest standard deviation from a mean value of brittleness index along the given length, and the given length to be within a pre-defined range.

2. The method of claim 1, wherein the samples of geological material are obtained from a well passing through the subsurface.

3. The method of claim 2, wherein the well comprises a deviated well.

4. The method of claim 1, wherein the samples of geological material comprise cuttings generated during well drilling, rock chips, rock cores obtained during well drilling or combinations thereof.

5. The method of claim 1, wherein the samples of geological material comprise particles having a size of from about 0.06 mm to about 2 mm.

6. The method of claim 1, wherein generating primary data further comprises using automated mineralogical analysis to generate the primary data.

7. The method of claim 6, wherein using automated mineralogical analysis comprises:
scanning the sample of geological material with a leptonic beam; and
measuring a reflected lepton beam and/or electromagnetic radiation and/or secondary generated leptons and/or generated baryons emerging from the scanned sample.

8. The method of claim 7, wherein using automated mineralogical analysis further comprises:
using the reflected lepton beam and the secondary generated leptons to generate an image of sample of geological material; and
using the electromagnetic radiation to determine a spatial deposition of elements in samples of geological material.

9. The method of claim 8, wherein using automated mineralogical analysis further comprises:
using the image of the sample of geological material to determine non-mineral volumes in the sample of geological material;
using the spatial deposition to infer types of minerals and location of minerals in the sample of geological material; and
using the types of minerals and the location of minerals to generate a spatially mapped mineralogical image of the sample of geological material and/or a single bulk mineral composition of the sample of geological material.

10. The method of claim 1, wherein using the secondary data further comprises a distribution of the size of the void spaces in the sample of geological material and/or a distribution of a measure of the shape of the void spaces in the sample of the geological material.

11. The method of claim 1, wherein using the primary data and the secondary data to generate tertiary data comprises using arithmetic combinations of at least one of primary data and second data to determine the quantification of physical characteristics of the sample of geological material.

12. The method of claim 1, wherein using the primary data, secondary data and tertiary data to determine the location of the stage and the arrangement of perforation clusters comprises:
determining a number of perforation clusters in the stage;
determining a number of perforations in each perforation cluster; and
determining a location of each perforation cluster in the stage.

13. A method for well completion, the method comprising:
obtaining a plurality of samples of geological material for a subsurface, each sample of geological material obtained from a unique position along a well passing through the subsurface;
generating primary data for each sample of geological material, the primary data comprising textural data, and/or chemical data and/or mineralogical data;
using the primary data to derive secondary data for each sample of geological material, the secondary data including a brittleness index for each sample;
using the primary data and the secondary data to generate tertiary data for the samples of geological material, the tertiary data comprising a quantification of physical characteristics of each respective sample of geological material;
using the quantification of physical characteristics of each sample of geological material to place the plurality of samples of geological material into a plurality of groups, each group comprising similar physical characteristics; and
using the primary data, the secondary data, the tertiary data and the groups to determine a location of a plurality of stages along a well and an arrangement of perforation clusters in each stage, the location being determined by segmenting the well into a plurality of lengths such that the brittleness indices for all samples of geological material within a given length comprise a lowest standard deviation from a mean value of brittleness index along the given length and the given length falls within a pre-defined maximum length and minimum length, each stage comprising one of the plurality of lengths.

14. The method of claim 13, wherein the maximum length comprises about 200 feet and the minimum length comprises about 100 feet.

15. The method of claim 13, wherein using the primary data, secondary data, tertiary data and groups to determine the arrangement of perforation clusters in each stage comprises:
determining a number of perforation clusters in each stage;
determining a number of perforations in each perforation cluster; and determining a location of each perforation cluster in each stage.

16. The method of claim 15, wherein determining the location of each perforation cluster in each stage comprises:
identifying regions along each stage where samples of geological material from a given region have similar quantifications of physical characteristics; and
locating a perforation cluster at each region.

17. The method of claim 13, wherein:
the generating of the primary data comprises using an automated mineralogical analysis to generate the primary data by scanning the sample of geological material with a leptonic beam and measuring a reflected lepton beam and/or electromagnetic radiation and/or secondary generated leptons and/or generated baryons;
the using of the primary data to derive the secondary data comprises using the primary data to generate a brittleness index for the sample of geological material and/or a distribution and shape of void spaces in the sample of geological material; and
the using of the primary data and the secondary data to generate the tertiary data comprises using arithmetic combinations of the primary data and/or the secondary data to determine the quantification of physical characteristics of the sample of geological material.

18. A system for well completion, the system comprising:
a geological sampling mechanism to obtain a plurality of samples of geological material for a subsurface, each sample of geological material obtained from a unique position along a well passing through the subsurface;
a primary data generating unit to generate primary data for each sample of geological material, the primary data comprising textural data and/or chemical data and/or mineralogical data;
a secondary data generating unit to use the primary data to derive secondary data for each sample of geological material from the textural data, the chemical data and the mineralogical data, the secondary data including a brittleness index;

a tertiary data generating unit
to use the primary data and the secondary data to generate tertiary data for the samples sample of geological material, the tertiary data comprising a quantification of physical characteristics of each sample of geological material and to place the plurality of samples of geological material into a plurality of groups, each group comprising similar physical characteristics; and a well completion determination unit to use the primary data, the secondary data and the tertiary data to determine a location of a plurality of stages along the well and an arrangement of perforation clusters in each stage, by segmenting the well into a plurality of lengths such that the brittleness indices for all samples of geological material within each given length among the lengths to have a lowest standard deviation from a mean value of brittleness index along the given length, and the given length to be within a pre-defined range.

* * * * *